US008528836B2

(12) United States Patent
Boyajian

(10) Patent No.: US 8,528,836 B2
(45) Date of Patent: Sep. 10, 2013

(54) LEAK STOPPING SPRINKLER HEADS

(76) Inventor: Marc Boyajian, Tujunga, CA (US)

( * ) Notice: Subject to any disclaimer, the term of this patent is extended or adjusted under 35 U.S.C. 154(b) by 610 days.

(21) Appl. No.: 12/761,136

(22) Filed: Apr. 15, 2010

(65) Prior Publication Data

US 2011/0253804 A1 Oct. 20, 2011

(51) Int. Cl.

| | |
|---|---|
| ***A01G 25/06*** | (2006.01) |
| ***B05B 15/06*** | (2006.01) |
| ***B05B 1/30*** | (2006.01) |
| ***B05B 15/10*** | (2006.01) |
| ***F16K 31/44*** | (2006.01) |

(52) U.S. Cl.
USPC ........... 239/204; 239/572; 239/570; 239/200; 251/66

(58) Field of Classification Search
USPC ............ 239/570, 571, 200–205, 572; 251/66
See application file for complete search history.

(56) References Cited

U.S. PATENT DOCUMENTS

| | | | | |
|---|---|---|---|---|
| 1,762,503 A * | 6/1930 | Buckner | 251/121 |
| 3,489,160 A | 1/1970 | Moore | |
| 3,750,954 A * | 8/1973 | Williams | 239/726 |
| 3,759,445 A | 9/1973 | King | |
| 3,794,057 A | 2/1974 | Badger | |
| 4,064,889 A | 12/1977 | Gayle et al. | |
| 4,562,962 A | 1/1986 | Hartman | |
| 4,716,937 A | 1/1988 | Hendrickson | |
| 4,762,140 A | 8/1988 | Davis | |
| 4,834,290 A * | 5/1989 | Bailey | 239/205 |
| 4,848,661 A | 7/1989 | Palmer et al. | |
| 4,867,603 A | 9/1989 | Chang | |
| 5,144,973 A | 9/1992 | Green et al. | |
| 5,174,500 A * | 12/1992 | Yianilos | 239/201 |
| 5,372,306 A | 12/1994 | Yianilos | |
| 5,454,394 A | 10/1995 | Moore et al. | |
| 5,524,824 A * | 6/1996 | Frimmer | 239/71 |
| 5,758,682 A | 6/1998 | Cain | |
| 6,178,982 B1 * | 1/2001 | Longstreth | 137/68.14 |
| 6,263,912 B1 | 7/2001 | Brown et al. | |
| 6,799,596 B2 | 10/2004 | Liebert | |
| 6,799,732 B2 | 10/2004 | Sirkin | |
| 7,293,721 B2 | 11/2007 | Roberts | |
| 7,798,431 B2 * | 9/2010 | Eader | 239/572 |
| 2003/0019950 A1 | 1/2003 | Veazie | |
| 2007/0034712 A1 | 2/2007 | Kah, Jr. | |

* cited by examiner

*Primary Examiner* — Len Tran
*Assistant Examiner* — Chee-Chong Lee
(74) *Attorney, Agent, or Firm* — David A. Belasco; Belasco Jacobs & Townsley, LLP

(57) ABSTRACT

A leak stopping sprinkler head includes a hollow body that has an upper portion and a lower portion fluidly connected to a valve body. The upper portion has a spraying nozzle and a first internal diameter. The lower portion has a second, larger internal diameter. The valve body includes a valve seat fluidly connected to the lower portion and a water supply. A hollow spheroid is larger than the first diameter, smaller than the second diameter and has perforations for passage of water. A rigid rod connects the spheroid and a sealing disk for the valve seat. The rod is sized to hold the disk away from the valve seat when the hollow body is intact. Destruction of the hollow body permits the spheroid to move out of the hollow body, pulling the rod and the disk upwardly, causing the disk to seal the valve, stopping the flow of water.

1 Claim, 9 Drawing Sheets

LEAK STOPPING SPRINKLER HEADS

FIELD OF INVENTION

This invention relates to the field of water conservation and more specifically to lawn irrigation sprinkler heads designed to prevent water loss should the sprinkler head be damaged.

BACKGROUND OF THE INVENTION

An increasing number of homes with lawns are irrigated with automatic sprinkler systems. These systems consist of a series of subterranean pipes attached to a water source through shutoff valves. The valves are usually connected to an electric timer. A series of sprinkler heads are attached to the pipes and serve to irrigate the lawn and gardens. As the sprinklers are controlled automatically by the electric timer, the sprinkler heads may be broken off or damaged at any time. If the sprinkler system is activated by the timer after the head is broken and no one is around to observe, the sprinkler system can send hundreds of gallons of water out of the broken head before the break is noticed and the system shut down. As a further problem, damage may result to the lawn in hot weather if the system is not run at all while waiting for repair of the broken head. In order to prevent the waste of large quantities of water and to prevent damage to lawns and gardens due to lack of watering, a system is needed that will shut of damaged or missing sprinkler heads while allowing other sprinkler heads attached to the system to remain in operation. A number of devices have been developed to address these problems.

U.S. Pat. No. 4,762,140, issued to Davis, discloses a snap-off plug valve. This device will shut off flow through the line when a downstream emitting element, such as a sprinkler head, is destructively removed from the line. A fracture groove on the exterior of the valve body defines a structurally weakest point and is axially located on the body between an upstream valve seat and a downstream limit stop. The limit stop maintains the valve in an open position during normal operation. Should the downstream emitting element be destructively removed, the supply line will break at its weakest point. The limit stop, being located downstream of the weakest point, will also be removed allowing the valve to close in response to inlet water pressure only, preventing loss of water from the supply line.

U.S. Pat. No. 6,799,732, issued to Sirkin is directed to a water sprinkler head with integral off-on water flow control valve and adaptive fittings therefore. The device in this patent provides a gradual shut off of water at the sprinkler head. The mechanism that shuts off the water to the upper part of the pop-up shaft below where the screen and insert are located is a reverse plunger containing small holes at its perimeter through which water passes from the riser pipe.

U.S. Pat. No. 5,372,306, issued to Yianilos illustrates a fail safe lawn sprinkler device. This device includes a sprinkler head and a valve assembly which couples the sprinkler head to the tap. The valve assembly includes a valve member, a coupling member, and a short nipple. The coupling member is connected to the tap by the nipple and has male threads at its upper end which engage female threads on the sprinkler head.

The valve member is located within a central axial bore of the coupling member and movable axially thereof in a vertical direction between an open or flow permitting position and a closed or flow preventing position. The sprinkler head maintains the valve member in its flow permitting position. However, when the sprinkler head is not in place on the assembly, the valve member is free to move in response to the flow of water through the tap to its flow preventing position, when water under pressure is being supplied to the water supply pipe.

If the sprinkler head is not in place on the tap, the valve member is permitted to move upwardly under the force of water supplied through the water supply pipe to its flow preventing position such that its valve surface engages the valve seat, sealing the outlet through the reduced diameter portion and bore of the coupling member. This shuts off the flow of water through the tap. Thus, the sprinkler head assembly with the valve assembly according to the present invention, permits water to flow out of the tap only when the sprinkler head is in place.

U.S. Patent Application No. 2007/0034712, published for Kah, Jr., disclose a broken sprinkler flow restriction or flow shut off suppressor for sprinkler This device includes a spring loaded restriction valve. The restriction valve may be inserted into the sprinkler body at a threaded inlet portion thereof before the inlet pipe is screwed into the sprinkler body to supply water to the sprinkler That is, the restriction valve is preferably positioned in the threaded area between the sprinkler body and the inlet pipe. The restriction valve preferably includes body portion, a valve member and a spring. Valve body is formed of an annular washer-like plate with one or more downwardly extending ribs. The ribs terminate at their lower ends in a guide ring. The valve member includes a valve disk and a downwardly extending valve stem which is positioned in the guide ring. A peripheral surface of the disk cooperates with a valve seat formed by complimentary surface on the radially inner margin of plate to open and close the valve. The guide ring guides the vertical movement of the valve stem.

The valve remains open unless or until the force of the water flowing through the valve pushes the valve member upward. Spring is partially compressed on assembly and presses against the flange to keep the valve open until the pressure exerted by the flow overcomes the bias of the spring to push the valve member upward into the closed position. This occurs when the pressure of the water flow reaches a predetermined pressure level sufficient to cause a differential pressure across the disk area of valve member to overcome the preload force of spring to keep the valve member down and the flow area between the opening and the disk open. As the valve member moves upward into the closed position, the opening is eliminated and the flow of water is cut off or restricted depending on the diameter fit between the outside circumference of the disk and the opening.

A predetermined pressure at which the valve member is moved into the closed position preferably corresponds to a flow rate in the sprinkler that is likely to cause damage and/or indicate a damaged sprinkler, for example, approximately 5-6 gallons per minute (GPM). The spring may be selected such that the spring bias is overcome at any desired flow rate.

U.S. Pat. No. 4,867,603, issued to Chang is directed to a device for preventing flooding caused by sprinkler failure. This device includes a fitting means which is designed such that its outer diameter fits tightly to the inner diameter of the riser. There is a valve seat affixed to the fitting means. The plug is movable in the axial direction and it is positioned upstream of the valve seat. The spring means provides a mechanical force to keep the plug away from the valve seat under normal flow rates so that the water can flow through the opening between the plug and the valve seat. There is a dashpot means which consists of a cylinder, piston, and piston rod. The cylinder is affixed to the fitting means by the supporting legs. The interior of the cylinder is filled with a viscous fluid and there are narrow flow paths communicating between the two sides of the piston. The piston is attached to the plug. Because the piston must move with the plug, a portion of the fluid in the cylinder is forced to flow from one side of the piston to the other whenever the plug moves. As a consequence the speed of the moving piston is limited by the volumetric rate of flow of the fluid through the narrow flow paths and the flow resistance through the narrow flow paths results in a damping force which resists movement of the plug.

Under normal conditions the water flows from the tee joint, around the plug, and exists through the outlet port. Hydrodynamic drag on the plug arising from the flow tends to drive the plug toward the valve seat. This force, which is approximately proportional to the second power of the flow rate, is transmitted to the spring by the piston and causes a compression of the spring. The spring is so designed that it can support the drag force resulting from normal flow, but not the force arising from flows substantially greater than normal. In the case of a missing sprinkler nozzle, or when the riser is broken, the flow increases substantially, resulting in an even greater increase in the hydraulic drag since the drag increases as the second power of the flow. This increased drag can overcome the spring force and, by pushing the plug towards the outlet port, eventually cause the plug to contact the valve seat. Thus, the flow disclosed shut-off device will remain open and not affect normal operation with intact risers and sprinkler heads, but it will close and shut off the water flow in the event either the sprinkler head is missing or the riser is broken.

It is an objective of the present invention to provide lawn irrigation sprinkler heads that include a self-sealing feature should the head become damaged or destroyed. It is a further objective to provide such sprinkler heads that function to prevent leaks without human interaction. It is a still further objective of the invention to provide sprinkler heads that will permit other sprinkler heads on a circuit to function with the loss of one or more heads on a circuit. It is yet a further objective to provide self-sealing sprinkler heads that are reliable and relatively maintenance free. Finally, it is an objective of the present invention to provide such sprinkler heads that are durable, inexpensive and easily installed.

While some of the objectives of the present invention are disclosed in the prior art, none of the inventions found include all of the requirements identified.

SUMMARY OF THE INVENTION

The present invention addresses all of the deficiencies of prior art leak stopping sprinkler head inventions and satisfies all of the objectives described above.

(1) A leak stopping sprinkler head, providing all of the desired features can be constructed from the following components. A cylindrical hollow body is provided. The hollow body has an upper portion and a lower portion. The lower portion is fluidly connected to a valve body. The upper portion has a spraying nozzle at a top end. The upper portion has a first predetermined internal diameter and the lower portion has a second, larger predetermined internal diameter. The valve body includes an upper connection, a valve seat fluidly connected to the upper connection and a lower connection. The lower connection is fluidly connected to a water supply line.

A hollow regular spheroid is provided. The spheroid has a diameter larger than the first predetermined internal diameter and smaller than the second predetermined diameter, an attachment point on an outer surface and a series of perforations. The perforations permit water to pass through the spheroid. A rigid connecting rod is provided. The connecting rod has a first end and a second end and is attached at the first end to the attachment point. A sealing disk is provided. The sealing disk has a diameter larger than the valve seat and a central connecting point on an upper surface. The connecting point is hingedly attached to the second end of the connecting rod. The connecting rod is located inside of the hollow body and the valve body and is sized to hold the sealing disk away from the valve seat when the hollow spheroid is restrained from upward movement by the first predetermined diameter within the cylindrical hollow body. Any of removal or destruction of the cylindrical hollow body permits the hollow spheroid to be urged upwardly by pressure of water flowing upwardly in the hollow body, the spheroid pulls the rigid connecting rod and the sealing disk upwardly, causing the sealing disk to seat against the valve seat, thereby terminating the flow of water upwardly through the hollow body. The sealing disk is held against the valve seat by water pressure from the water supply line.

(2) In a variant of the invention, the sealing disk includes a resilient upper surface. The resilient upper surface provides an improved seal to the bottom end of the sprinkler riser pipe.

(3) In another variant, the regular spheroid is a sphere.

(4) In still another variant, the sealing disk further includes a central aperture. The aperture penetrates the disk and is sized and shaped to produce a sound when water flows through the aperture under pressure from the supply line. The sound alerts a user to a broken or missing sprinkler head.

(5) In yet another variant, a leak stopping sprinkler head, includes a hollow cylindrical casing. The casing has a top surface, a central aperture penetrating the top surface, a surrounding vertical wall and a threaded attachment at a lower end of the vertical wall. The threaded attachment connects the casing to a water supply line. A sprinkler pipe is provided. The pipe has an upper end, a lower end and has a spray nozzle located at the upper end. The pipe is sized to fit slidably through the central aperture.

A sealing flange is provided. The flange is located about an outer circumference of the sprinkler pipe at a height to limit upward travel of the sprinkler pipe to a first predetermined distance through the central aperture as water pressure from the water supply line urges the sprinkler pipe upwards. The flange bears against an underside of the top surface of the casing. A self-closing spring operated valve is provided. The valve is held in an open position by the sprinkler pipe located through it. The valve controls the flow of water from the water supply line into the casing and the sprinkler pipe. The valve moves to a closed position if the sprinkler pipe moves upwardly beyond the first predetermined distance due to breakage or removal of either or both of the casing and the sprinkler pipe, thereby terminating the flow of water from the water supply line.

(6) In a further variant the valve further includes a sphere. The sphere is pivotally mounted in a spherical seat. The seat is in fluid connection with the water supply line and the casing. The sphere has a passage through it. The passage is sized to fit slidably about the sprinkler pipe. An elastic member is provided. The member urges the sphere to rotate to a closing position in the spherical seat, thereby terminating the flow of water from the water supply line. The sprinkler pipe is located through the passage upon mounting of the sprinkler head, thereby holding the valve in an open position. The valve moves to the closing position upon removal of the sprinkler pipe from the passage due to either breakage or removal of either or both of the casing or the sprinkler pipe.

(7) In a final variant of the invention, the valve further includes a circular seat. The seat is sized to fit slidably about the sprinkler pipe and is in fluid connection with the water supply line and the casing. A valve door is provided. The valve door is hingedly mounted and sealably located adjacent the seat. A closing spring is provided. The spring urges the valve door toward the seat. The sprinkler pipe is located through the valve door upon mounting of the sprinkler head, thereby holding the valve door in an open position. The valve moves to a closed position upon removal of the sprinkler pipe from the valve door due to either or both of breakage or removal of either the casing or the sprinkler pipe.

An appreciation of the other aims and objectives of the present invention and an understanding of it may be achieved by referring to the accompanying drawings and the detailed description of a preferred embodiment.

DESCRIPTION OF THE DRAWINGS

DETAILED DESCRIPTION OF THE PREFERRED EMBODIMENT (1) FIGS. 1-10 illustrate a leak stopping sprinkler head 10, providing all of the desired features that can be constructed from the following components. A cylindrical hollow body 14 is provided. The hollow body 14 has an upper portion 18 and a lower portion 22. The lower portion 22 is fluidly connected to a valve body 26. The upper portion has a spraying nozzle 30 at a top end 32. The upper portion 18 has a first predetermined internal diameter 34 and the lower portion 22 has a second, larger predetermined internal diameter 38. The valve body includes an upper connection 42, a valve seat 46 fluidly connected to the upper connection 42 and a lower connection 50. The lower connection 50 is fluidly connected to a water supply line 54. A hollow regular spheroid 58 is provided. The spheroid 58 has a diameter larger than the first predetermined internal diameter 34, an attachment point 62 on an outer surface 66 and a series of perforations 70. The perforations 70 permit water 74 to pass through the spheroid 58. A rigid connecting rod 78 is provided. The connecting rod 78 has a first end 82 and a second end 86 and is attached at the first end 82 to the attachment point 62.

Figure 1:
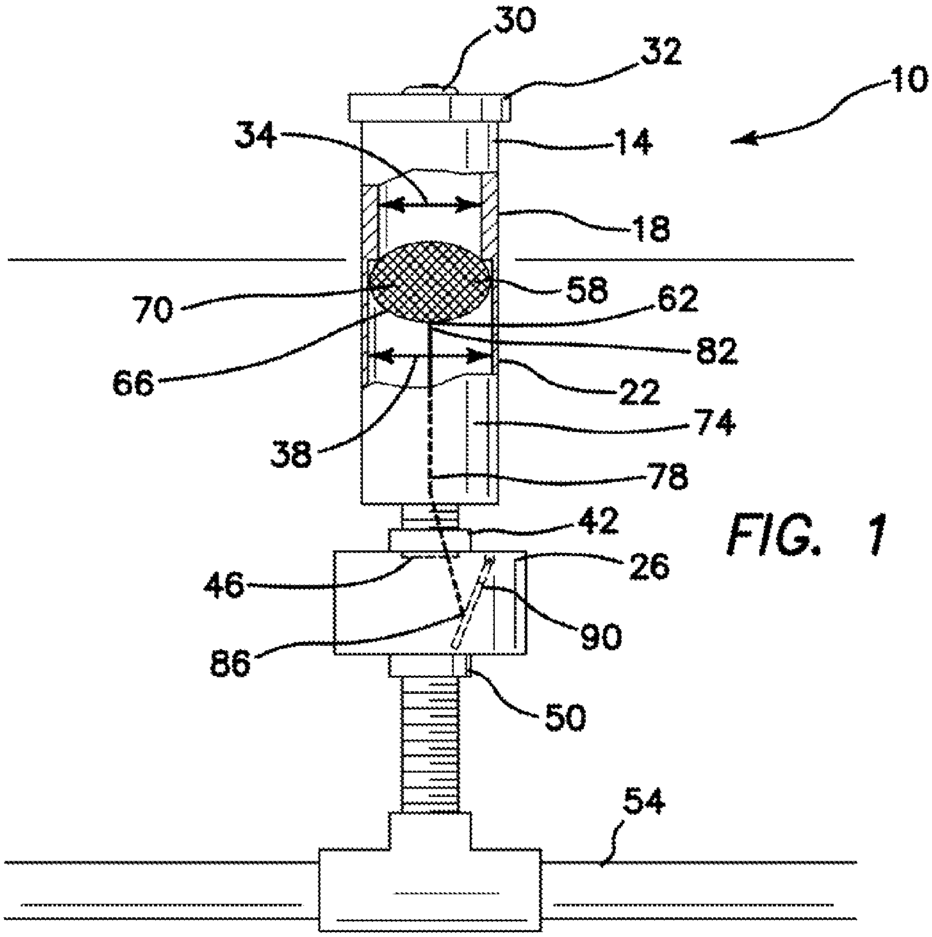
FIG. 1 is a partial cross-sectional side elevational view of a first embodiment of the invention illustrating a fixed sprinkler head with emergency shut-off valve in an open position.
Figure 1A:
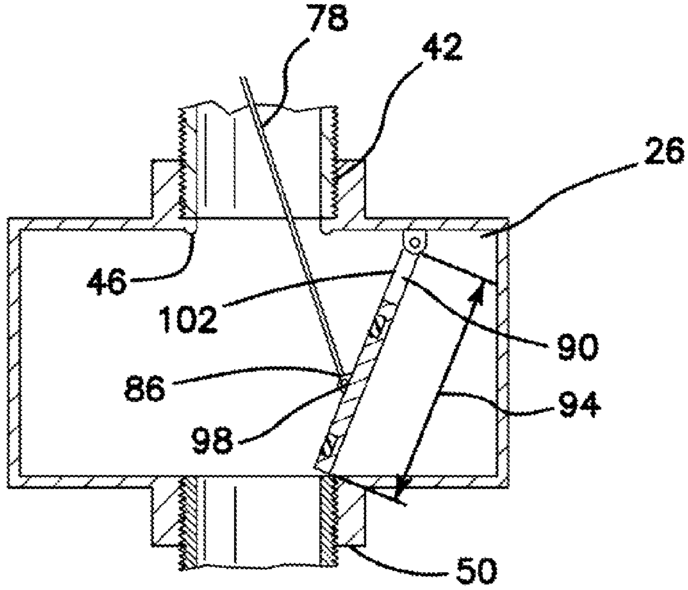
FIG. 1A is a cross-sectional side elevational view of the valve body and shut-off valve of the FIG. 1 embodiment, illustrating the valve in the open position.

A sealing disk 90 is provided. The sealing disk 90 has a diameter 94 larger than the second predetermined internal diameter 38 and a central connecting point 98 on an upper surface 102. The connecting point 98 is hingedly attached to the second end 86 of the connecting rod 78. The connecting rod 78 is located inside of the hollow body 14 and sized to hold the sealing disk 90 away from the valve seat 46 when the hollow spheroid 58 is restrained from upward movement by the first predetermined diameter 34 within the cylindrical hollow body 14. Removal or destruction of the cylindrical hollow body 14 permits the hollow spheroid 58 to be urged upwardly by pressure of water 74 flowing upwardly in the hollow body 14. The spheroid 58 pulls the rigid connecting rod 78 and the sealing disk 90 upwardly, causing the sealing disk 90 to seat against the valve seat 46, thereby terminating the flow of water 74 upwardly through the hollow body 14. The sealing disk 90 is held against the valve seat 46 by water pressure from the water supply line 54.

Figure 2:
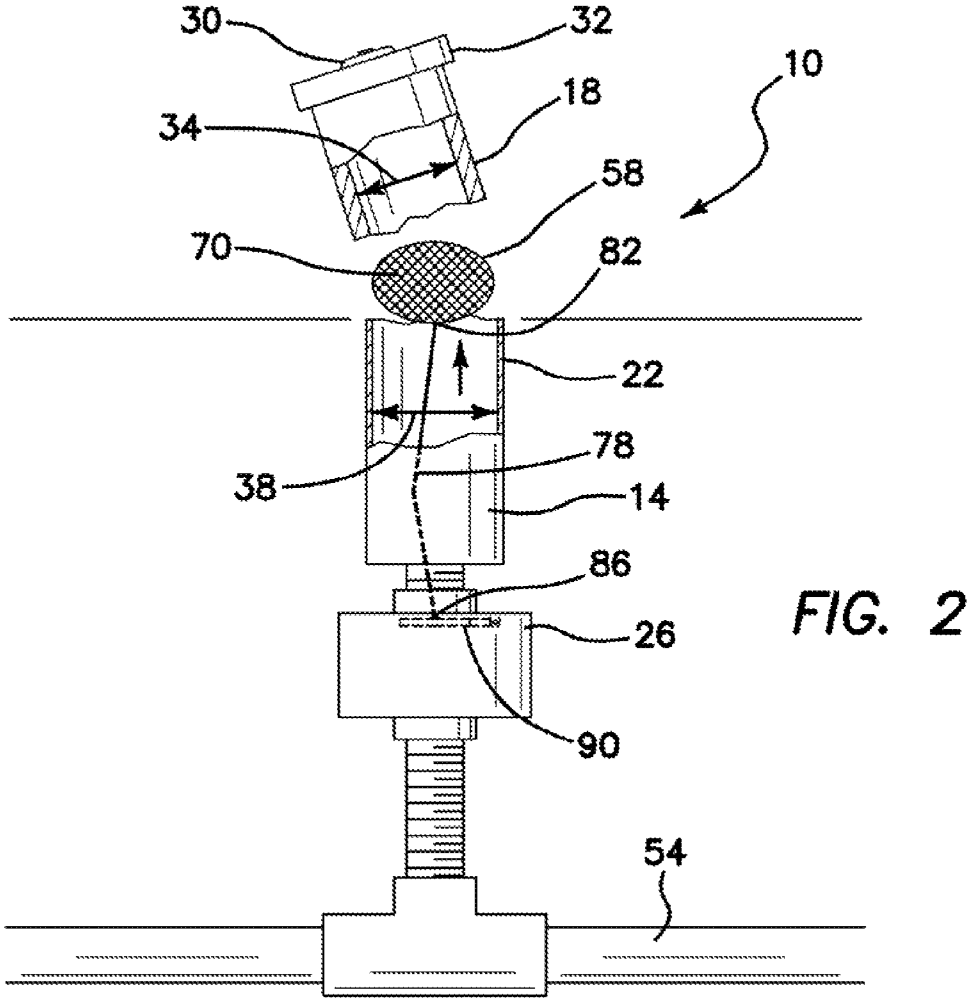
FIG. 2 is a partial cross-sectional side elevational view of the FIG. 1 embodiment after the sprinkler head has been damaged and the shut-off valve is in a closed position.
Figure 2A:
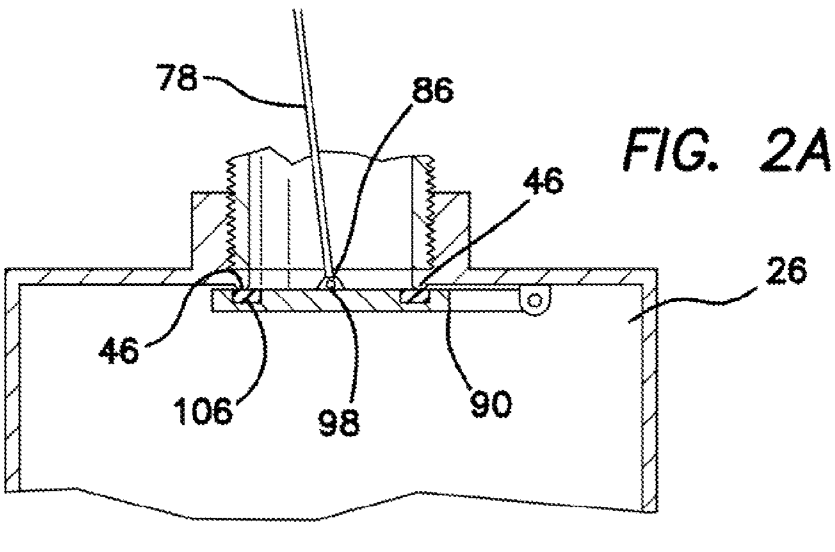
FIG. 2A is a partial cross-sectional side elevational view of the valve body and shut-off valve of the FIG. 1 embodiment, illustrating the valve in the closed position.

(2) In a variant of the invention, as illustrated in FIG. 2A, the sealing disk 90 includes a resilient upper surface 106. The resilient upper surface 106 provides an improved seal to the valve seat 46.

Figure 3:
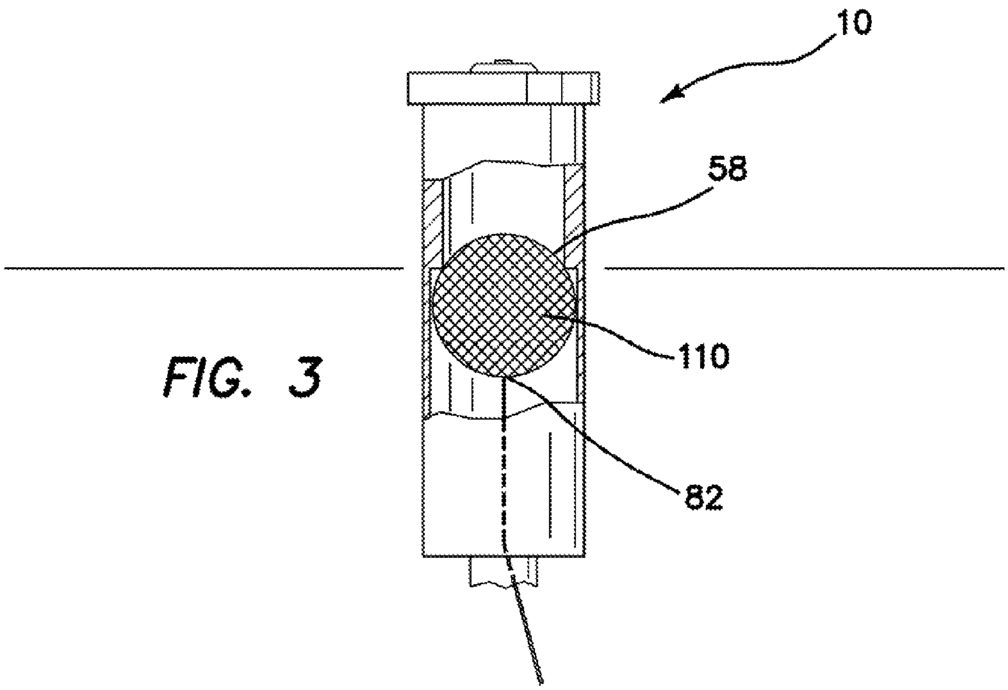
FIG. 3 is a cross-sectional side elevational view of the cylindrical hollow body of the FIG. 1 embodiment illustrating a spherical, perforated spheroid controlling the position of the shut-off valve.

(3) In another variant, as illustrated in FIG. 3, the regular spheroid 58 is a sphere 110.

Figure 4:
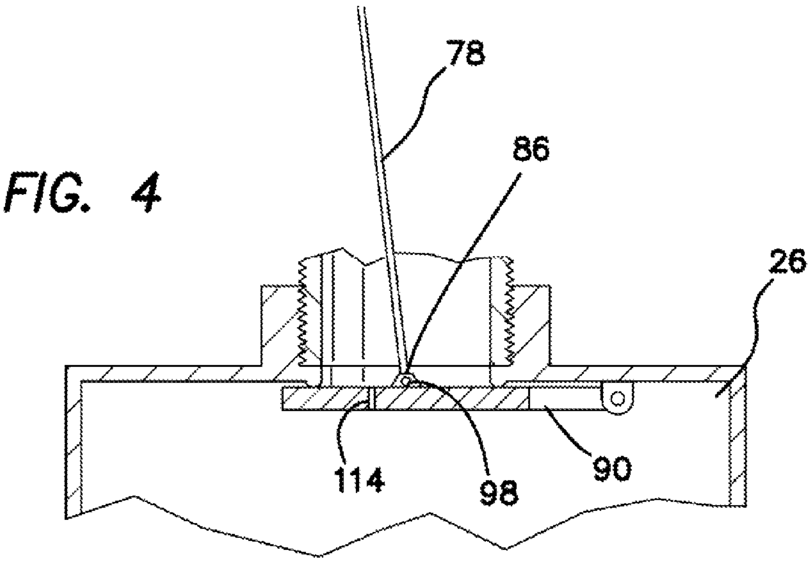
FIG. 4 is a partial cross-sectional side elevational view of the valve body and shut-off valve of the FIG. 1 embodiment, illustrating the valve in the closed position and an orifice in the valve disk designed to provide a whistling noise upon breakage of the sprinkler head.

(4) In still another variant, as illustrated in FIG. 4, the sealing disk 90 further includes a central aperture 114. The aperture 114 penetrates the disk 90 and is sized and shaped to produce a sound when water 74 flows through the aperture 114 under pressure from the supply line 54. The sound 118 alerts a user (not shown) to a broken or missing sprinkler head 10.

Figure 5:
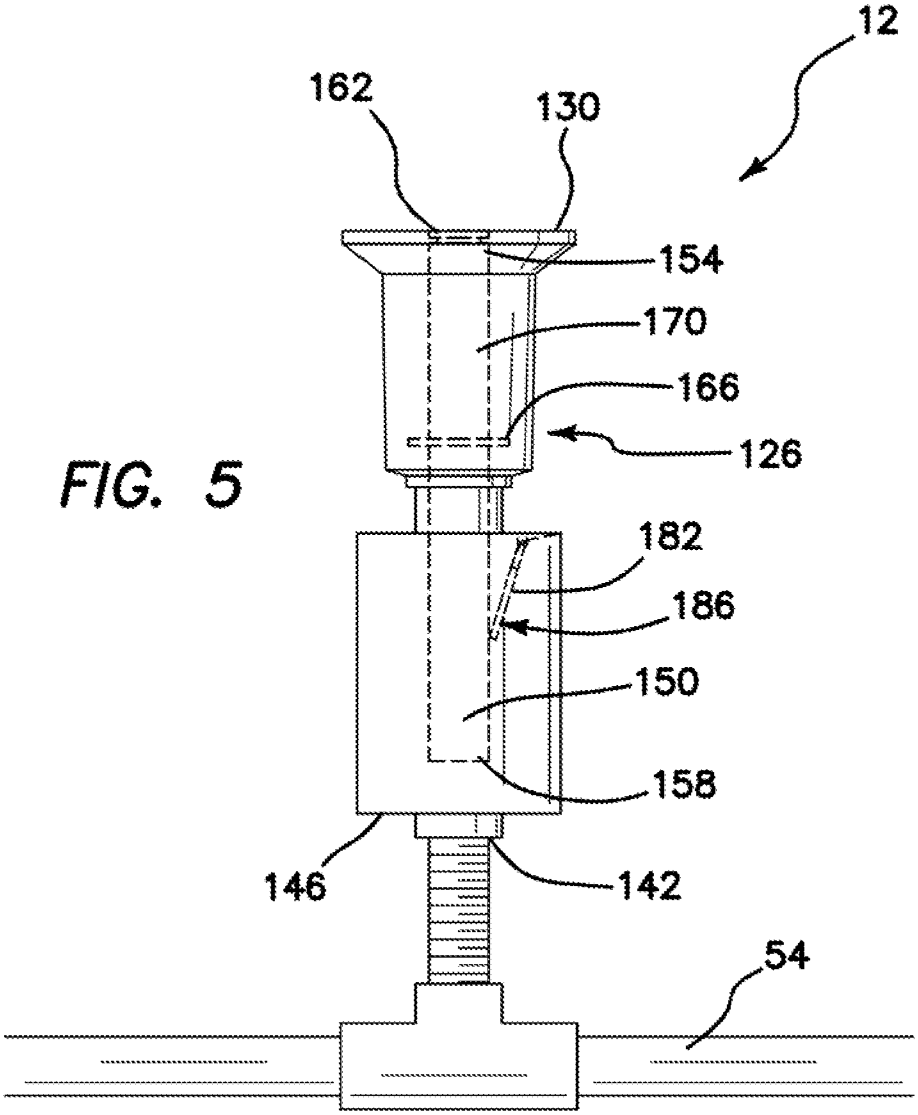
FIG. 5 is a side elevational view of a second embodiment of the invention, illustrating a pop-up sprinkler pipe in a lowered position and an emergency shut-off valve in an open position.
Figure 6:
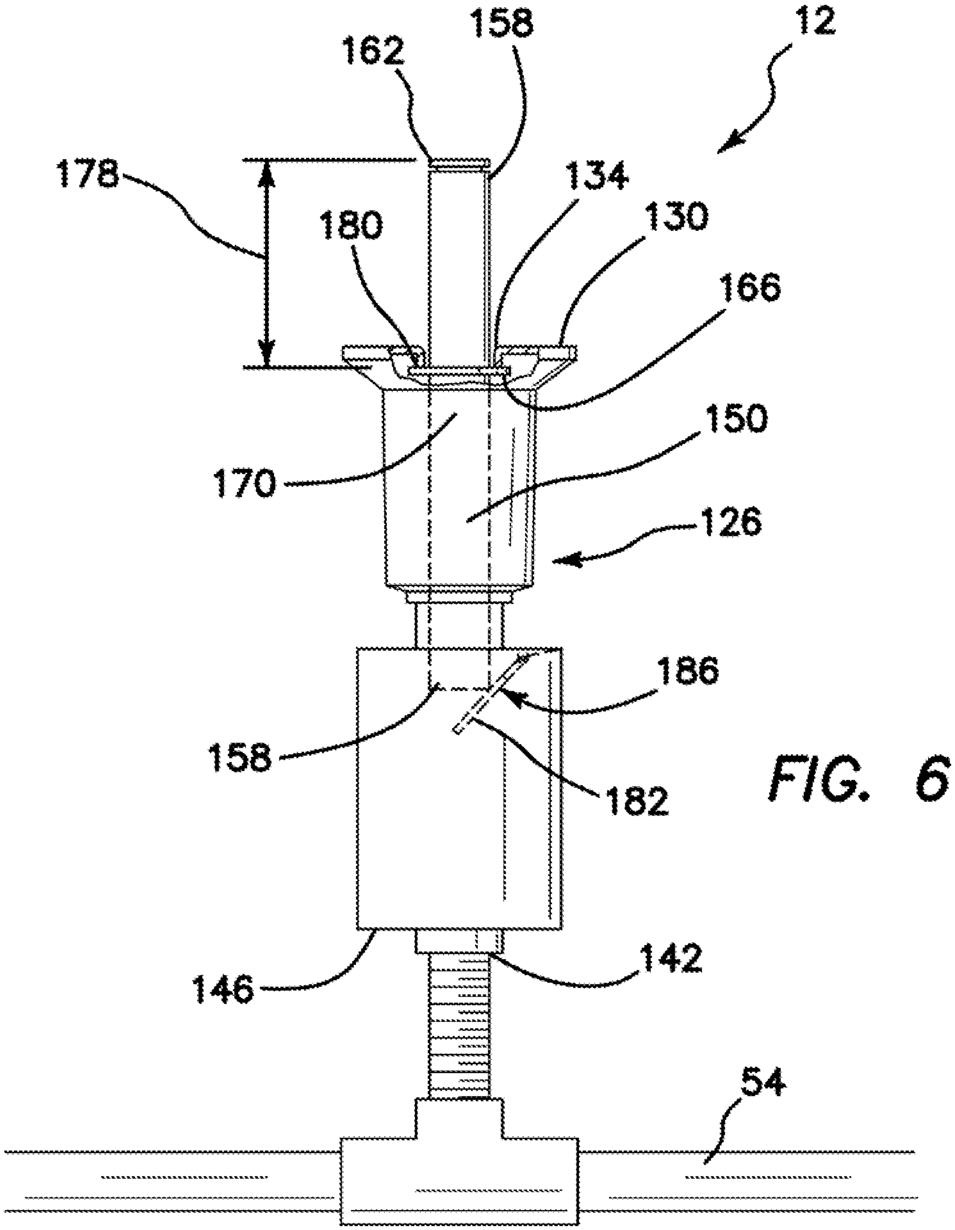
FIG. 6 is a side elevational view of the FIG. 5 embodiment, illustrating the pop-up sprinkler pipe in a raised position and the emergency shut-off valve in the open position.
Figure 7:
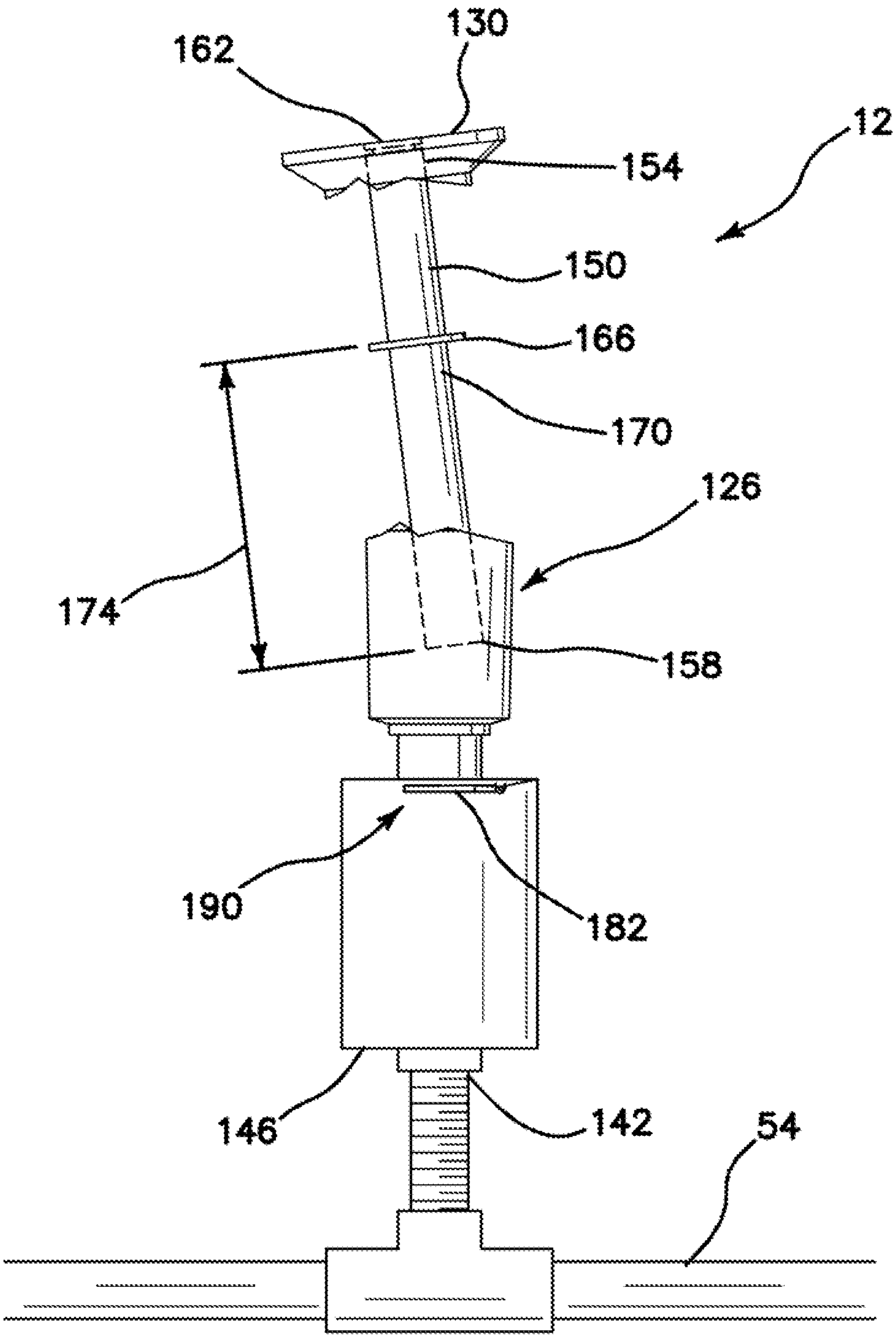
FIG. 7 is a side elevational view of the FIG. 5 embodiment, illustrating the pop-up sprinkler pipe in a raised position after breakage of the sprinkler head and the emergency shut-off valve in the closed position.

(5) In yet another variant, as illustrated in FIGS. 5-7, a leak stopping sprinkler head 12, includes a hollow cylindrical casing 126. The casing 126 has a top surface 130, a central aperture 134 penetrating the top surface 130 and a threaded attachment 142 at a lower end 146 of the casing 126. The threaded attachment 142 connects the casing 126 to a water supply line 58. A sprinkler pipe 150 is provided. The pipe 150 has an upper end 154, a lower end 158 and has a spray nozzle 162 located at the upper end 154. The pipe 150 is sized to fit slidably through the central aperture 134.

A sealing flange 166 is provided. The flange 166 is located about an outer circumference 170 of the sprinkler pipe 150 at a height 174 to limit upward travel of the sprinkler pipe 150 to a first predetermined distance 178 through the central aperture 134 as water pressure from the water supply line 54 urges the sprinkler pipe 150 upwards. The flange 166 bears against an underside 180 of the top surface 130 of the casing 126. A self-closing spring operated valve 182 is provided. The valve 182 is held in an open position 186 by the sprinkler pipe 150 located through it. The valve 182 controls the flow of water (not shown) from the water supply line 54 into the casing 126 and the sprinkler pipe 150. The valve 182 moves to a closed position 190 if the sprinkler pipe 150 moves upwardly beyond the first predetermined distance 178 due to breakage or removal of either or both of the casing 126 and the sprinkler pipe 150, thereby terminating the flow of water from the water supply line 54.

Figure 9:
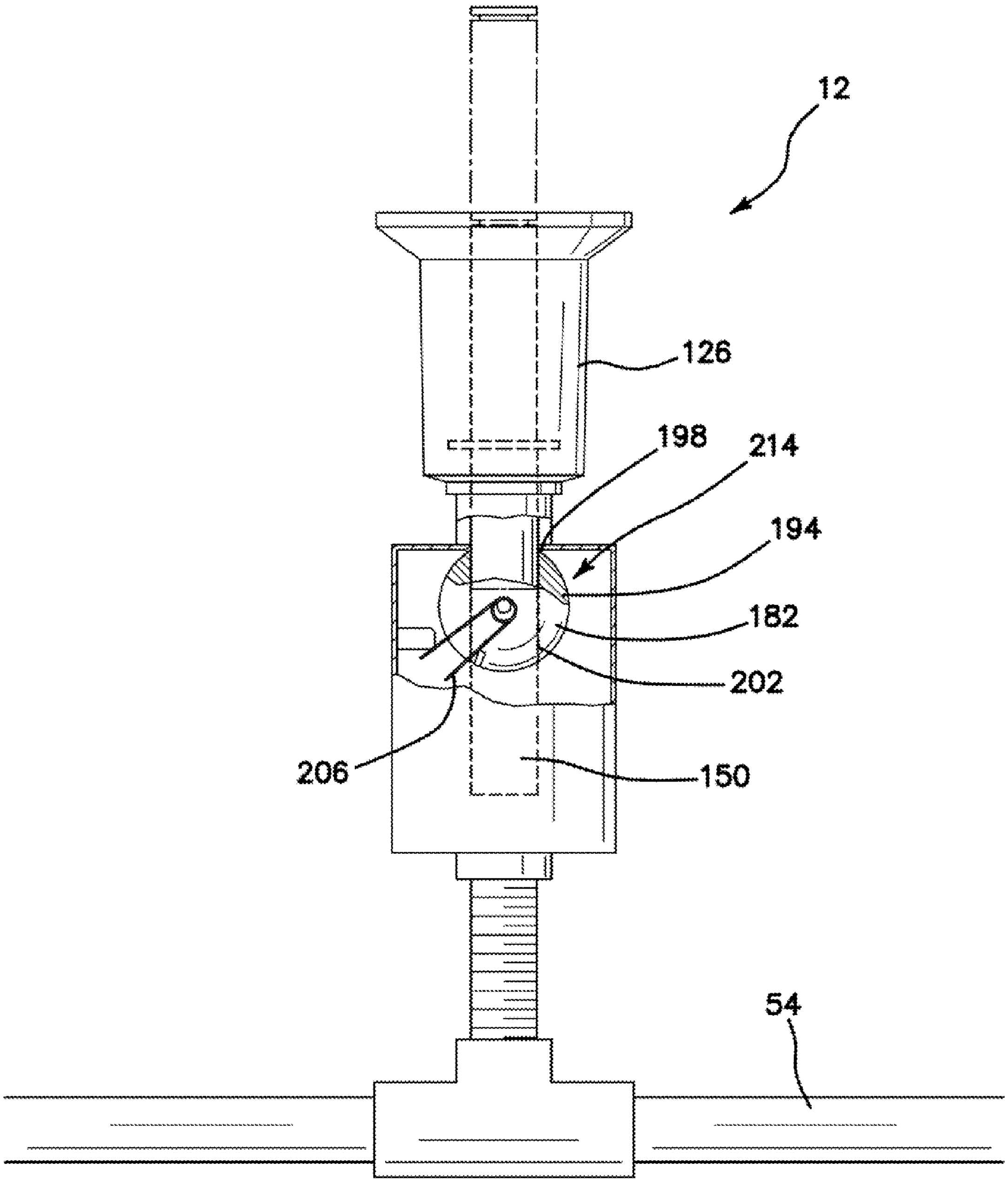
FIG. 9 is a cross-sectional side view of the FIG. 5 embodiment incorporating an alternative spherical shut-off valve shown in the open position.
Figure 10:
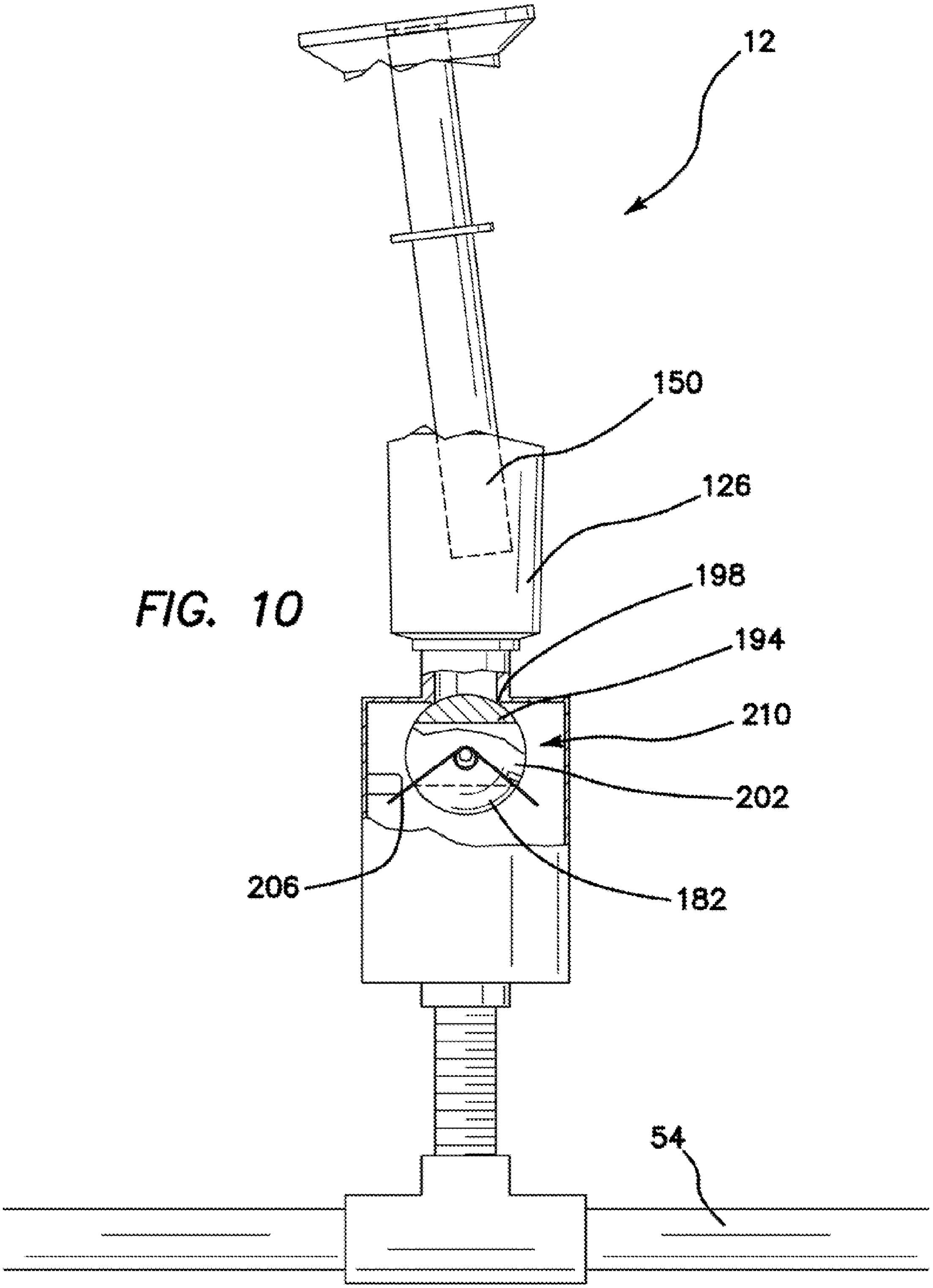
FIG. 10 is a cross-sectional side view of the FIG. 5 embodiment incorporating the alternative spherical shut-off valve shown in the closed position after breakage of the sprinkler head.

(6) In a further variant as illustrated in FIGS. 9 and 10, the valve 182 further includes a sphere 194. The sphere 194 is pivotally mounted in a spherical seat 198. The seat 198 is in fluid connection with the water supply line 54 and the casing 126. The sphere 194 has a passage 202 through it. The passage 202 is sized to fit slidably about the sprinkler pipe 150. An elastic member 206 is provided. The member 206 urges the sphere 194 to rotate to a closing position 210 in the spherical seat 198, thereby terminating the flow of water 78 from the water supply line 54. The sprinkler pipe 150 is located through the passage 202 upon mounting of the sprinkler head 12, thereby holding the valve 182 in an open position 214. The valve 182 moves to the closing position 210 upon removal of the sprinkler pipe 150 from the passage 202 due to either breakage or removal of either or both of the casing 126 or the sprinkler pipe 150.

Figure 8:
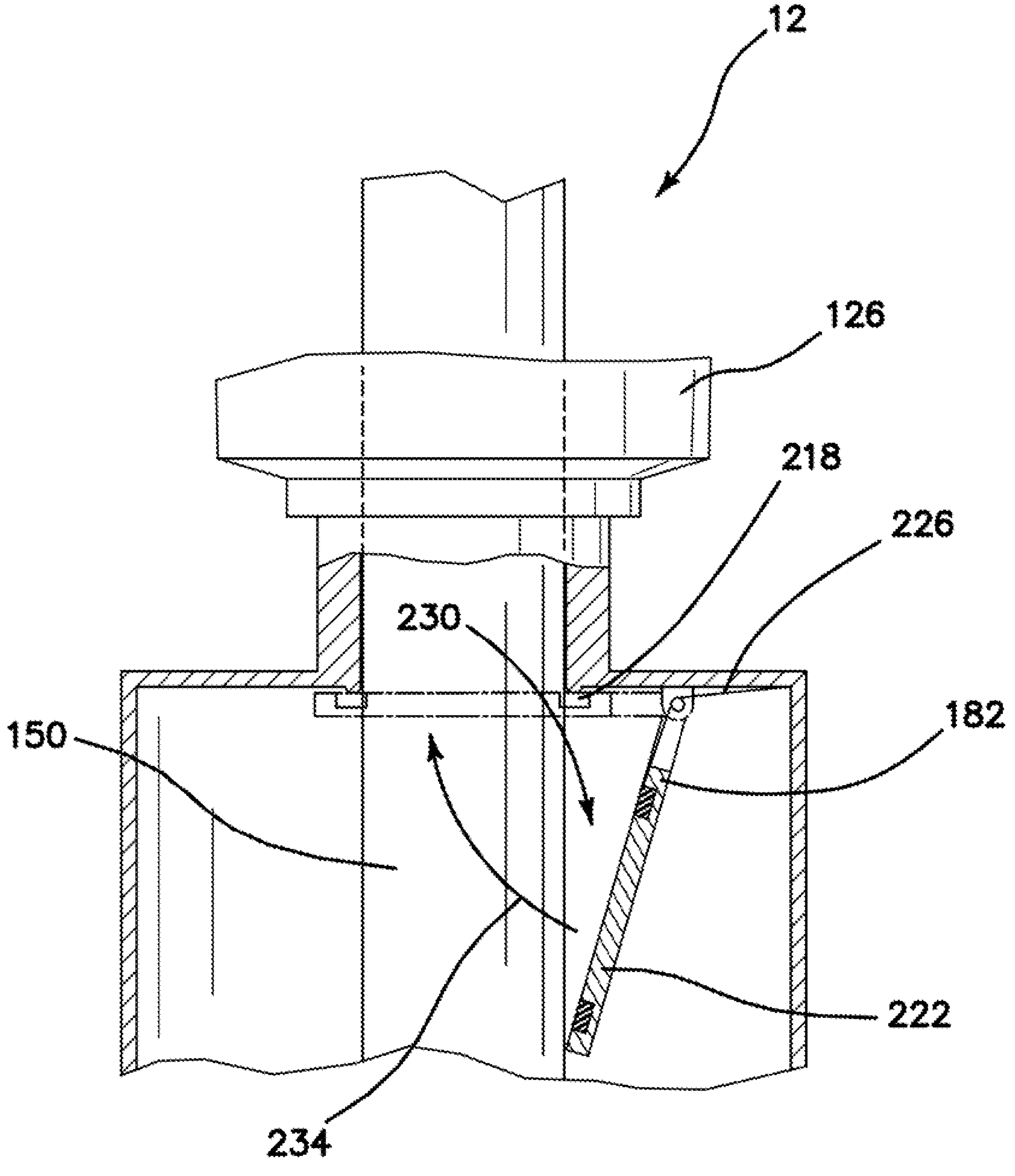
FIG. 8 is a partial cross-sectional side view of the valve body of the FIG. 5 embodiment illustrating a circular valve seat and valve combination.

(7) In a final variant of the invention, as illustrated in FIG. 8, the valve 182 further includes a circular seat 218. The seat 218 is sized to fit slidably about the sprinkler pipe 150 and is in fluid connection with the water supply line 54 and the casing 126. A valve door 222 is provided. The valve door 222 is hingedly mounted and sealably located adjacent the seat 218. A closing spring 226 is provided. The spring 226 urges the valve door 222 toward the seat 218. The sprinkler pipe 150 is located through the valve door 222 upon mounting of the sprinkler head 12, thereby holding the valve door 222 in an open position 230. The valve 182 moves to a closed position 234 upon removal of the sprinkler pipe 150 from the valve door 222 due to either or both of breakage or removal of either the casing 126 or the sprinkler pipe 150.

The leak stopping sprinkler heads 10 and 12 have been described with reference to particular embodiments. Other modifications and enhancements can be made without departing from the spirit and scope of the claims that follow.

The invention claimed is:

1. A leak stopping sprinkler head, comprising:

a hollow cylindrical casing, said casing having a top surface, a central aperture penetrating said top surface, a surrounding vertical wall, a threaded attachment at a lower end of said vertical wall, said threaded attachment connecting said casing to a water supply line;

a sprinkler pipe, said pipe having an upper end, a lower end and having a spray nozzle disposed at said upper end and being sized to fit slidably through said central aperture;

a sealing flange, said flange being disposed about an outer circumference of said sprinkler pipe at a height to limit upward travel of said sprinkler pipe to a first predetermined distance through said central aperture as water pressure from said water supply line urges said sprinkler pipe upwards, said flange bearing against an underside of said top surface of said casing;

a self-closing spring operated valve, said valve being held in an open position by said sprinkler pipe disposed therethrough, said valve controlling flow of water from said water supply line into said casing and said sprinkler pipe; and wherein said valve moves to a closed position if said sprinkler pipe moves upwardly beyond said first predetermined distance due to any of breakage and removal of either of said casing and said sprinkler pipe, thereby terminating said flow of water from said water supply line;

a sphere, said sphere being pivotally mounted in a spherical seat, said seat being in fluid connection with said water supply line and said casing;

said sphere having a passage therethrough, said passage being sized to fit slidably about said sprinkler pipe;

an elastic member, said member urging said sphere to rotate to a closing position in said spherical seat, thereby terminating said flow of water from said water supply line; and wherein said sprinkler pipe is disposed through said passage upon mounting of said sprinkler head, thereby holding said valve in an open position, said valve moving to said closing position upon removal of said sprinkler pipe from said passage due to either of breakage and removal of either of said casing and said sprinkler pipe.

* * * * *